(12) United States Patent
Kuwayama

(10) Patent No.: US 7,073,097 B2
(45) Date of Patent: Jul. 4, 2006

(54) TWO-MCU SYSTEM AND HANG-UP DETECTING METHOD OF MCU

(75) Inventor: Yasunori Kuwayama, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 730 days.

(21) Appl. No.: 09/950,605

(22) Filed: Sep. 13, 2001

(65) Prior Publication Data

US 2002/0095620 A1 Jul. 18, 2002

(30) Foreign Application Priority Data

Sep. 13, 2000 (JP) ............................. 2000-278128

(51) Int. Cl.
*G06F 11/00* (2006.01)
(52) U.S. Cl. ...................... 714/51; 714/23; 714/25; 714/55
(58) Field of Classification Search ............ 714/23–25, 714/32, 51, 55
See application file for complete search history.

(56) References Cited

U.S. PATENT DOCUMENTS

| | | | | |
|---|---|---|---|---|
| 6,535,943 B1* | 3/2003 | Hatamori et al. | ........... | 710/261 |
| 6,584,587 B1* | 6/2003 | McDermott | ................... | 714/55 |
| 6,594,774 B1* | 7/2003 | Chapman et al. | ............... | 714/2 |
| 6,708,286 B1* | 3/2004 | Alexander et al. | ............. | 714/11 |

FOREIGN PATENT DOCUMENTS

| | | | |
|---|---|---|---|
| JP | 02-028735 | | 1/1990 |
| JP | 2-281367 | | 11/1990 |
| JP | 02281367 | * | 11/1990 |
| JP | 10322458 | * | 12/1998 |
| JP | 11-053225 | | 2/1999 |
| JP | 11-085569 | | 3/1999 |
| JP | 2002-041329 | | 2/2002 |

* cited by examiner

*Primary Examiner*—Robert Beausoliel
*Assistant Examiner*—Emerson Puente
(74) *Attorney, Agent, or Firm*—Crowell Moring LLP

(57) ABSTRACT

A two-MCU system includes a main-MCU and a sub-MCU. When any one of operating keys is operated, an operation signal is applied to the sub-MCU. Thereupon, the sub-MCU detects the operation of the operating key, and makes a timer start to count a time period. The sub-MCU, when no specified command is received from the main-MCU irrespective of a lapse of a predetermined time period, determines that the main-MCU is being in a hang-up state. Then, the sub-MCU applies a reset signal to a reset circuit thereby to reset the main-MCU, and the two-MCU system returns from the hang-up.

11 Claims, 4 Drawing Sheets

TWO-MCU SYSTEM AND HANG-UP DETECTING METHOD OF MCU

BACKGROUND OF THE INVENTION

1. Field of the Invention

This invention relates to two-MCU system and a hang-up detecting method of an MCU (Micro-Computer Unit), and more particularly to a hang-up detecting method of an MCU in a two-MCU system provided with a main-MCU power-on-reset and a sub-MCU reset by the main-MCU, wherein the sub-MCU detects a hang-up state of the main-MCU, and the two-MCU system.

2. Description of the Prior Art

An example of this kind of a conventional two-MCU system is disclosed in a Japanese Patent Laying-open No.2-281367 (G 06F 15/16) laid-open on Nov. 19, 1990. The system is provided with a main-CPU and a sub-CPU, and pulses are outputted from the sub-CPU to a watchdog timer at a predetermined cycle. When the pulses are stopped, over-running of the sub-CPU is detected. Then, when detecting the over-running, a reset signal is outputted from the watchdog timer, and the sub-CPU is initialized.

A system of this prior art is applied to a DVD, a VTR, and etc, for example. In the DVD or VTR, there was a problem that the main-CPU is brought into a hang-up state because a complex control such as image or video processing is executed by the main-CPU. That is, it results in a situation of not accepting the key operation. However, according to this prior art, in the case the sub-CPU over-runs, the sub-CPU can be initialized, but when the main-CPU is hung-up, it is impossible to deal with it.

Furthermore, in the case the main-CPU is hung-up, the most that can be done is a plug is pulled out from a socket to stop a power supply and to reset. That is, it causes bother of operation.

Meanwhile, in the case the main-CPU is subjected to a hang-up, since the key operation cannot be accepted, a user determines a DVD or a VTR have a breakdown, causing a problem of sending them for repair.

SUMMARY OF THE INVENTION

Therefore, it is a primary object of the present invention to provide a novel two-MCU system and a hang-up detecting method of an MCU.

It is another object of this invention to provide a two-MCU system and a hang-up detecting method of an MCU capable of detecting a hang-up of a main-MCU with ease.

It is another object of this invention to provide a two-MCU system and a hang-up detecting method of an MCU capable of returning a main-MCU from a hang-up.

A detecting method according to this invention is directed to a two-MCU system provided with a main-MCU which is power-on-reset and a sub-MCU which is reset by the main-MCU, the main-MCU applying a command to the sub-MCU according to an operation of an operating key, and comprises the following steps of: (a) applying an operation signal from a specified operating key to the sub-MCU; and (b) detecting by the sub-MCU a hang-up of the main-MCU when no specified command is received within a predetermined time period from a time that the sub-MCU has received the operation signal.

For example, the main-MCU governs control of an overall system, and the sub-MCU governs control of a mechanism. In such a system, when the operating key provided on a system main body is operated, an operation signal from the operating key is applied to the sub-MCU, whereby the sub-MCU detects the operation of the operating key. On the other hand, the main-MCU applies a command to the sub-MCU according to the operation of the operating key. Accordingly, the sub-MCU can determine that the main-MCU is being in a hang-up state when no specified command is received from the main-MCU within a predetermined time period regardless of the operation of the operating key. Thus, the hang-up of the main-MCU can be detected.

Meanwhile, if the two-MCU system is provided with a remocon reception circuit, the main-MCU can apply a command to the sub-MCU according to the operation of a remocon transmitter. In such a case, since an instruction signal from the remocon transmitter is applied to the sub-MCU, it is possible for the sub-MCU to detect the hang-up of the main-MCU according to the key operation of the remocon transmitter.

In addition, if the sub-MCU applies a reset signal to a reset circuit of the main-MCU upon detecting the hang-up of the main-MCU, the main-MCU is reset to allow the system to be restored.

In another aspect, a detecting method according to this invention is directed to a two-MCU system provided with a main-MCU which is power-on-reset and a sub-MCU which is reset by the main-MCU, the sub-MCU applying an instruction signal to the main-MCU in response to a reception of an instruction signal from an operating key, and the main-MCU applying a command to the sub-MCU in response to the instruction signal, and comprises the following step of: detecting by the sub-MCU a hang-up of the main-MCU when no specified command is received within a predetermined time period from a time that the sub-MCU has applied the instruction signal.

For example, the main-MCU governs control of an overall system, and the sub-MCU governs control of a mechanism. In this system, when the operating key provided on a system main body is operated, the instruction signal according to the operating key is applied to the sub-MCU. Thus, the sub-MCU detects the key operation and applies the instruction signal to the main-MCU. In accordance with this, the main-MCU applies the command to the sub-MCU. Accordingly, the sub-MCU determines that the main-MCU is brought into a hang-up state when no specified command is received within a predetermined time period irrespective of applying the instruction signal to the main-MCU. Thus, it is possible to detect the hang-up of the main-MCU.

Meanwhile, if the two-MCU system is provided with a remocon reception circuit, the main-MCU can apply a command to the sub-MCU according to the operation of a remocon transmitter. In such a case, since an instruction signal from the remocon transmitter is applied to the sub-MCU, it is possible for the sub-MCU to detect the hang-up of the main-MCU according to the key operation of the remocon transmitter.

In addition, if the sub-MCU applies a reset signal to a reset circuit of the main-MCU upon detecting the hang-up of the main-MCU, the main-MCU is reset to allow the system to be restored.

A two-MCU system according to this invention comprises: a main-MCU which is power-on-reset; a sub-MCU which is reset by the main-MCU, the main-MCU applying a command to the sub-MCU according to an operation of an operating key; a reset circuit which resets the main-MCU; and a timer which starts counting a time period when the sub-MCU receives an operation signal from a specified operating key, wherein the sub-MCU applies a reset signal to the reset-circuit when no specified command is received within a predetermine time period from a time that the operation signal has been received.

In a further aspect, a two-MCU system according to this invention comprises: a main-MCU which is power-on-reset; a sub-MCU which is reset by the main-MCU, the sub-MCU applying an instruction signal to the main-MCU in response to a reception of an instruction signal from an operating key, and the main-MCU applying a command to the sub-MCU in response to the instruction signal; a reset circuit which resets the main-MCU; and a timer which starts counting a time period when the sub-MCU applies the instruction signal, wherein the sub-MCU applies a reset signal to the reset circuit when no specified command is received within a predetermined time period from a time that the instruction signal has been applied.

According to this invention, since an operation signal from the operating key is inputted to the sub-MCU, it is possible to detect the hang-up of the main-MCU with ease.

Meanwhile, since a reset signal to the main-MCU is outputted form the sub-MCU, there is no need to pull out a plug from a socket. That is, it is easy to restore from the hang-up.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
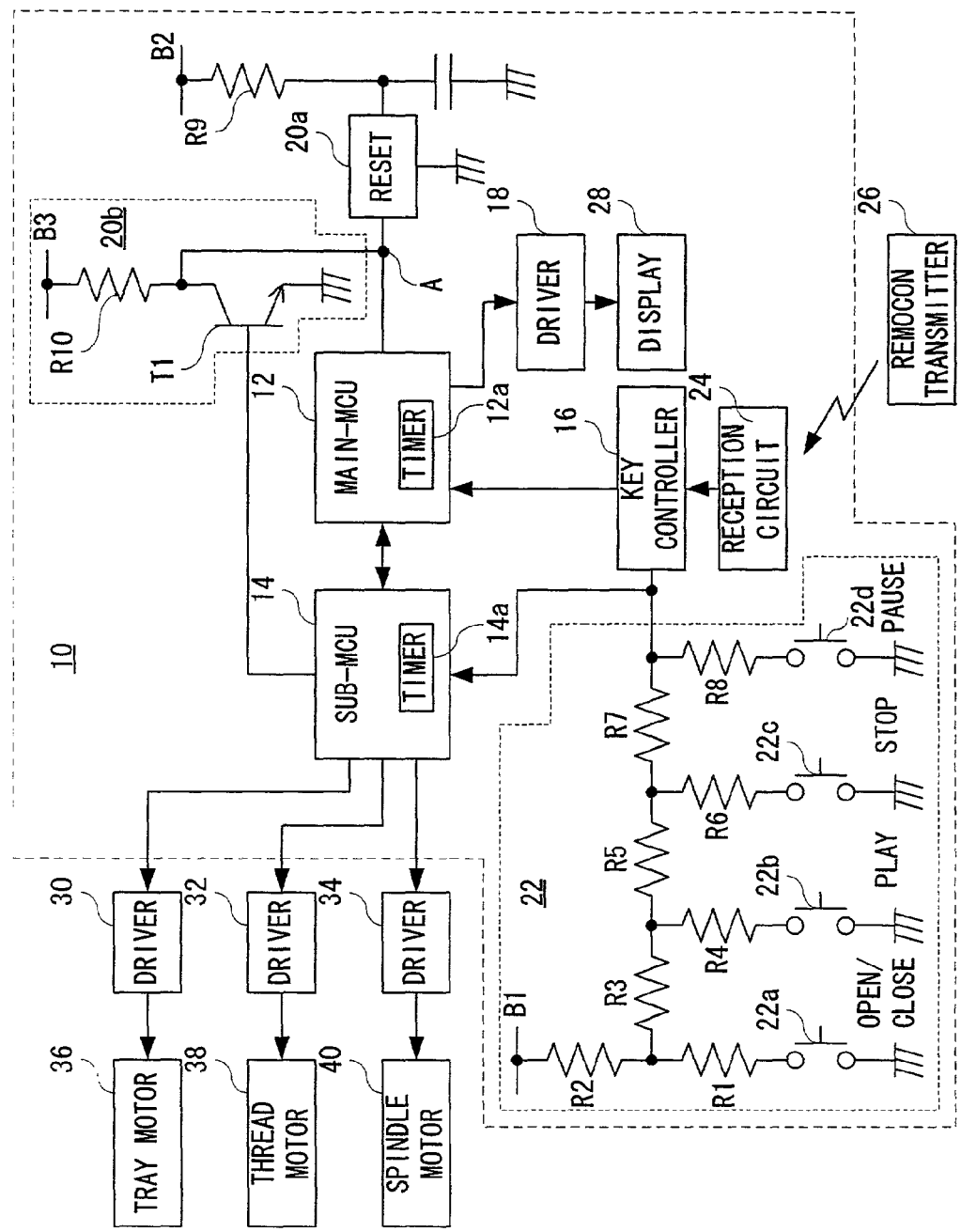
FIG. 1 is an illustrative view showing one embodiment of the present invention.

Referring to FIG. 1, a two-MCU system 10 (hereinafter referred merely to as "system") of this embodiment includes a main-MCU 12 and a sub-MCU 14, and can be applied to apparatus such as a DVD reproducing apparatus although the illustration is omitted.

The main-MCU 12 includes a timer 12a, and is connected with a key controller 16, a driver 18, and reset circuits 20a and 20b. The key controller 16 is connected with an operation panel 22 and a remocon reception circuit (hereinafter referred merely to as "reception circuit") 24. Operating keys 22a to 22d included in the operation panel 22 and a light-receiving portion (not shown) of the reception circuit 24 are disposed on a surface of a main body of the DVD reproducing apparatus.

For example, the operating key 22a is for opening or closing a disk tray (not shown). The operating key 22b is for reproducing a disk. Furthermore, the operating key 22c is for stopping reproduction. The operating key 22d is for pausing reproduction.

It is noted that the operation panel 22 is, although omitted, provided with keys for fast-forwarding or rewinding reproduction in this embodiment.

Referring to FIG. 1, one ends of the operating key 22a–22b are connected to a ground. Other end of the operating key 22a is connected to a bias B1 through resistors R1 and R2. Meanwhile, a connecting point of the resistors R1 and R2 is connected with one end of a resistor R3. Other end of the resistor R3 is connected to other end of the operating key 22b through a resistor R4, and connected to one end of a resistor R7 through a resistor R5. A resistor R6 is, at one end thereof, connected to a connection point of the resistors R7 and R5, and is, at other end, connected to other end of the operating key 22c. Other end of the resistor R7 is connected to the sub-MCU 14 and the key controller 16, and connected to other end of the operating key 22d through a resistor R8.

Meanwhile, the driver 18 is connected with a display 28 constituted by light emitting elements such as an LED, and etc. The display 28 is also provided on the surface of the main body of the DVD reproducing apparatus.

Furthermore, the reset circuit 20a is connected to a bias B2 through a resistor R9. Meanwhile, a connecting point of the main-MCU 12 and the reset circuit 20a is connected with a collector of a transistor T1 and connected to one end of a resistor R10. Other end of the resistor R10 is connected to a bias B3. A base of the transistor T1 is connected to the sub MCU 14, and an emitter of the transistor T1 is connected to the ground. The reset circuit 20b is constructed by the bias B3, the resistor R10, and the transistor T1.

Then, the sub-MCU 14 is similar in construction to the main-MCU 12, and includes a timer 14a. The sub-MCU 14 is connected with drivers 30–34. The driver 30 is connected with a tray motor 36 for opening or closing the disk tray. The driver 32 is connected with a thread motor 38 for moving an optical pickup (not shown) in a radial (thread) direction of a disk (not shown). Furthermore, the driver 34 is connected with a disk motor (spindle motor) 40 for rotating a disk with a turntable.

It is noted that the tray motor 36, the thread motor 38, and the spindle motor 40 are only shown as a mechanical composition for the purpose of simply explanation in this embodiment.

For example, the main-MCU 12 is supplied with a voltage from the bias B2 through the resistor R9 and the reset circuit 20a. The reset circuit 20a, when a main power source of the DVD reproducing apparatus is switched from off to on, resets (power-on-reset) the main-MCU 12. Then, the main-MCU 12 resets the sub-MCU 14. It is noted that in a state that the main power source is turned on, that is, a state that a plug (not shown) of the DVD reproducing apparatus is inserted in a socket (not shown), an electric power is constantly supplied to the main-MCU 12.

If any one of the operating keys 22a–22d is operated in a state that an electric power is supplied to the main-MCU 12, a voltage according to an operated key is inputted to the key controller 16. An instruction signal according to the key operation of the operating keys 22a–22d, i.e. according to an input voltage is outputted to the main-MCU 12 from the key controller 16.

Meanwhile, an instruction signal transmitted from a remocon transmitter 26 is received at the reception circuit 24, and the instruction signal received at the reception circuit 24 is outputted to the main-MCU 12 through the key controller 16. It is noted that the instruction signal from the remocon transmitter 26 passes through the key controller 16 to be applied to the main-MCU 12.

When the instruction signal is applied to the main-MCU 12, a specific control signal (command) is applied from the main-MCU 12 to the sub-MCU 14. The sub-MCU 14 controls the drivers 30–34 according to the command applied from the main-MCU 12 to drive the tray motor 36, the thread motor 38, or the spindle motor 40 for rotation. Meanwhile, the main-MCU 12, in the case of reproducing a disk, processes an image or video signal and an audio signal, and controls the driver 18 to display disk information (contents of disk) and time (reproducing time or hour) on the display 28.

It is noted that the main-MCU 12 displays disk information on the display 28 on the basis of information read from a disk. Meanwhile, the main-MCU 12 displays the reproducing time on the display 28 with reference to a timer value of the timer 12*a*, and furthermore, displays the hour on the display 28 with reference to a timepiece circuit (not shown).

That is, the main-MCU 12 governs control of the overall system 10, while the sub-MCU 14 governs control of the machinery (mechanism) of each motor, and etc.

In such a system 10, since an amount of processing of image signals is very large, if an instruction signal, and etc. by the key operation is inputted to the main-MCU 12 during the execution of the processing, the main-MCU 12 is brought into a hang-up state, and thus, the main-MCU 12 becomes not to accept the key operation of the operating keys 22*a*–22*d* and the remocon transmitter 26. For avoiding this, in this embodiment, the key operation can be detected by applying an operation signal to the sub-MCU 34, and in the case of the hang-up of the main MCU 12, it is possible for the sub-MCU 34 to electrically reset the main-MCU 12.

More specifically, when any one of operating keys 22*a*–22*d* is operated, an instruction signal is inputted from the key controller 16 to the main-MCU 12. Meanwhile, an operation signal is inputted from the operation panel 22 to the sub-MCU 14. Thereupon, the sub-MCU 14 controls the timer 14*a* to start counting a time. Then, the sub-MCU 14 determines whether a specified command is inputted from the main-MCU 12 or not.

For example, in the case the main-MCU 12 is normally operated, a command corresponding to the any one of operating keys 22*a*–22*d* is applied to the sub-MCU 14. However, in the case the main-MCU 12 is hung-up, no command is applied to the sub-MCU 14 irrespective of the key operation.

Accordingly, the sub-MCU 14, with reference to a timer value of the timer 14*a*, determines that the main MCU 12 is brought into a hang-up state after a lapse of a predetermined time (20 seconds in this embodiment) from a time the key operation (operation signal) is presented. In addition, if a command is inputted from the main-MCU 12 by the lapse of twenty (20) seconds, the sub-MCU 14 controls the drivers 33-34 according to the inputted command.

When it is determined the main-MCU 12 is being in a hang-up state, the sub-MCU 14 outputs a reset signal to the reset circuit 20*b*. Specifically, a voltage of high-level is outputted to the base of the transistor T1 during a predetermined time (5 seconds in this embodiment). Thereupon, the transistor T1 is turned on, and a voltage at an A point drops, and the main-MCU 12 is reset. After lapse of five (5) seconds, the output of the reset signal from the sub-MCU 14 is stopped, and the transistor T1 is turned off. Accordingly, the voltage at the A point is returned to a predetermined voltage (3.3V), and the reset of the main-MCU is canceled. Then, a reset signal is applied from the main-MCU 12 to the sub-MCU 14, and the system 10 is returned to the normal state.

Figure 2:
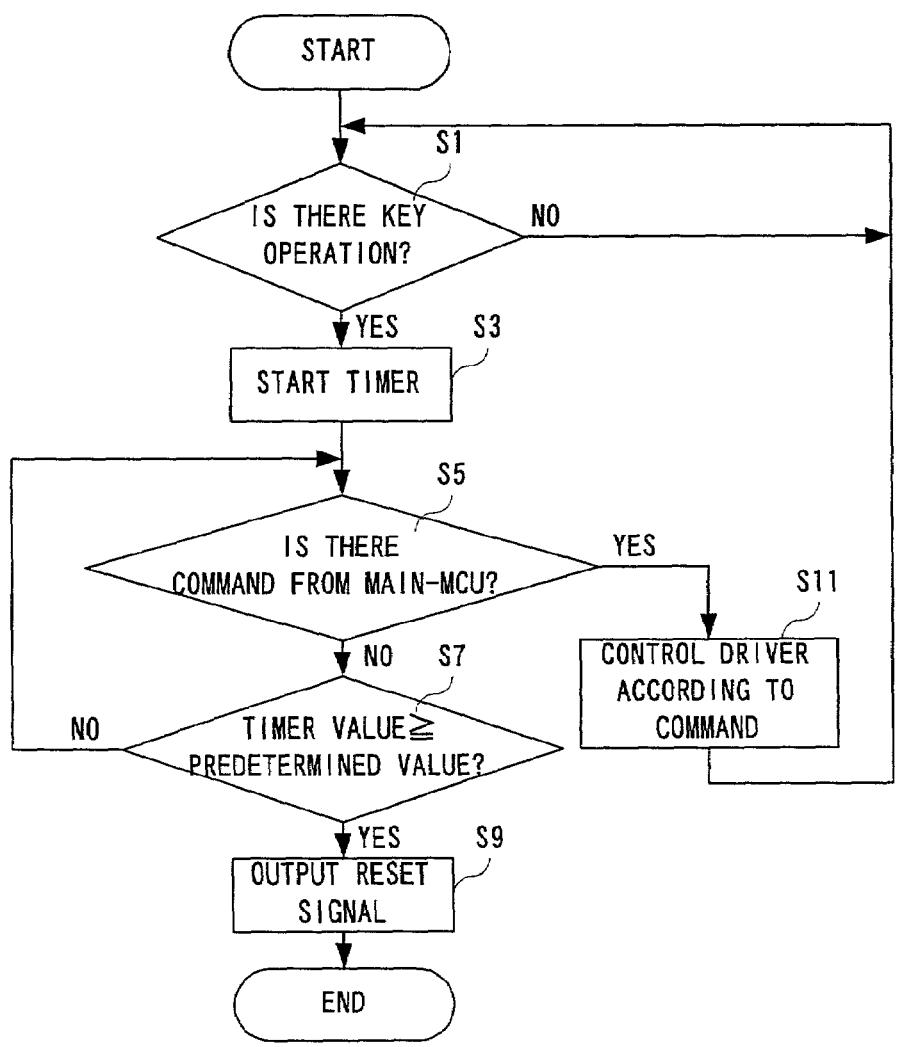
FIG. 2 is a flowchart showing a part of processing of a sub-MCU shown in FIG. 1.

More specifically, the sub-MCU 14 executes the processing according to a flowchart shown in FIG. 2. It is noted that the sub-MCU 14 executes, in parallel, various kinds of control processing according to commands applied from the main-MCU 12 besides the FIG. 2 processing.

Firstly, in step S1, the sub-MCU 14 determines whether the key operation is present or not. If "NO" is determined in the step S1, i.e. the key operation of the operating keys 22*a*–22*d* is not present, the process returns to the same step S1. On the other hand, if "YES" is determined in the step S1, i.e. it is determined the key operation is presented by operating any one of the operating keys 22*a*–22*d* and receiving an operation signal, the sub-MCU 34 makes the timer 14*a* start to count in step S3.

Subsequently, whether a specified command is received from the main MCU 12 or not is determined in step S5. If "YES" is determined in the step S5, i.e. the command is inputted from the main-MCU 12, in step 11, any one of the drivers 30-34 is controlled according to the inputted command, and then, the process returns to the step S1.

On the other hand, if "NO" is determined in the step S5, i.e. the command is not received, whether the timer value is a predetermined value (for example, 20 seconds) or more is determined in step S7. That is, the sub-MCU 14 detects which one of operating keys 22*a*–22*b* has been operated in the step S1, and in the case of the main-MCU 12 is normally operated, the sub-MCU 34 ought to receive a command according to the key operation from the main-MCU 12. Accordingly, whether the command should be received or not is monitored during a predetermined time period (20 seconds), and whether the main-MCU 12 is hung-up or not is judged (determined).

If "NO" is determined in the step S7, i.e. twenty (20) seconds has not been lapsed, the process directly returns to the step S5. On the other hand, if "YES" is determined in the step S7, i.e. the twenty (20) seconds has been lapsed, it is determined the main-MCU 12 is subjected to a hang-up, and a reset signal is outputted during a predetermined time period (for example, 5 seconds) in step S9, and then, the process is ended.

According to the embodiment shown, by inputting a key operation signal to the sub-MCU 14, and only by monitoring whether a specified command is provided from the main-MCU 12 or not within a predetermined time period, a hang-up of the main-MCU 12 can be easily detected, thus capable of detecting a hang-up with ease.

Meanwhile, it is possible to return from a hang-up in a state that a plug is not pulled out from a socket.

It is noted that, since an instruction signal from the remocon transmitter 26 directly passes through the key controller 16, an operation signal is not inputted to the sub-MCU 14. That is, in this embodiment, it is impossible to detect a hang-up of the main-MCU 12 by the key operation of the remocon transmitter 26.

Figure 3:
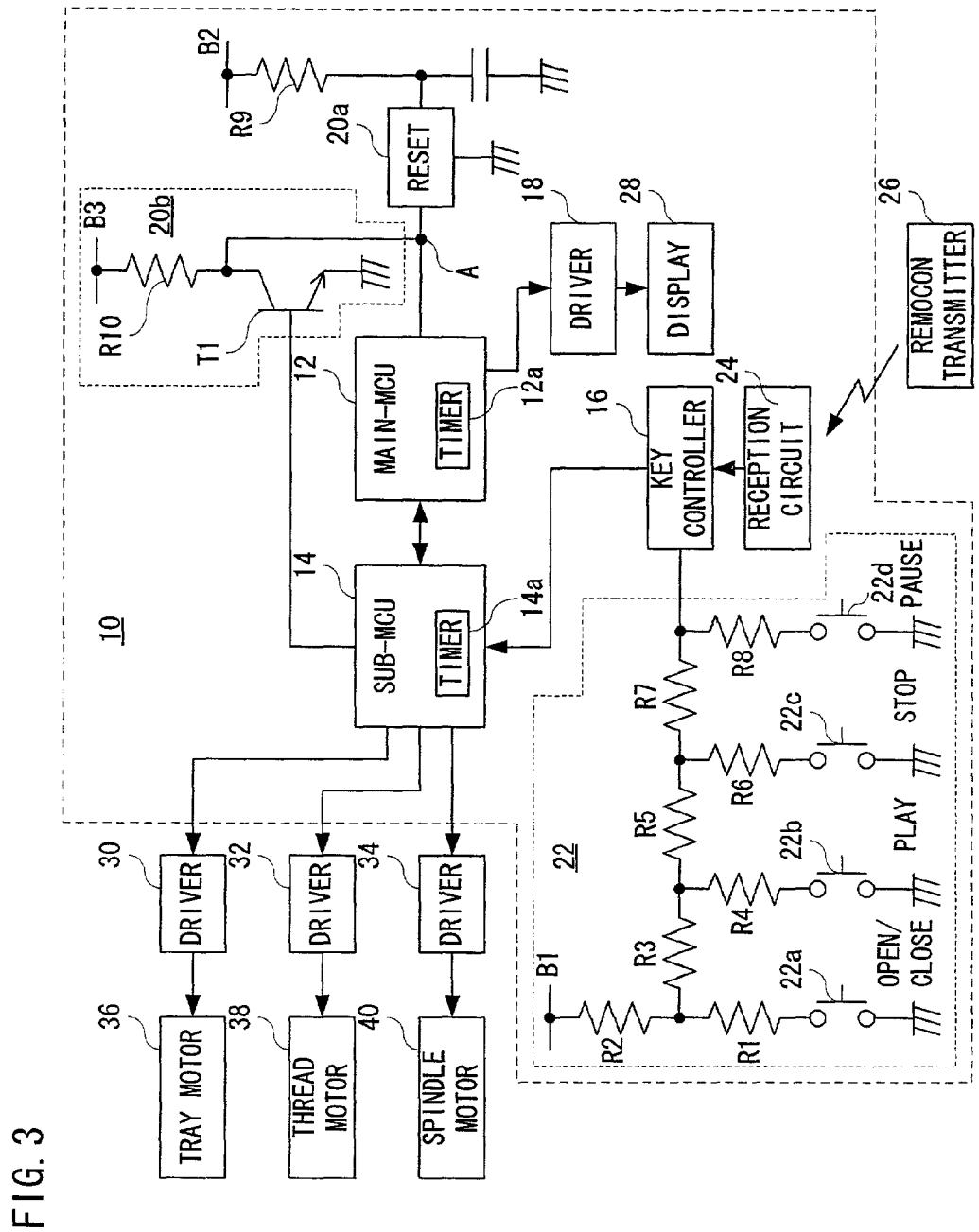
FIG. 3 is an illustrative view showing another embodiment of the present invention.

A system 10 of another embodiment shown in FIG. 3 is the same with that of FIG. 1 embodiment except that an instruction signal outputted from the key controller 16 is inputted to the sub-MCU 14 to make the sub-MCU 34 detect the key operation, and the sub-MCU 14 outputs an instruction signal to the main-MCU 12 to receive a specified command from the main-MCU 12, and thus, a duplicate explanation will be omitted.

In this system 10, when the key operation of the operation panel 22 or the remocon transmitter 26 is presented, an operation signal according to the key operation is applied to the sub-MCU 14. Thereupon, the sub-MCU 14 applies an instruction signal to the main-MCU 12, and then, starts to count by the timer 14*a*. In the case a specified command is not received by the lapse of a predetermined time period (20 seconds), the sub-MCU 14 determines that the main-MCU 12 is brought into a hang-up state.

Figure 4:
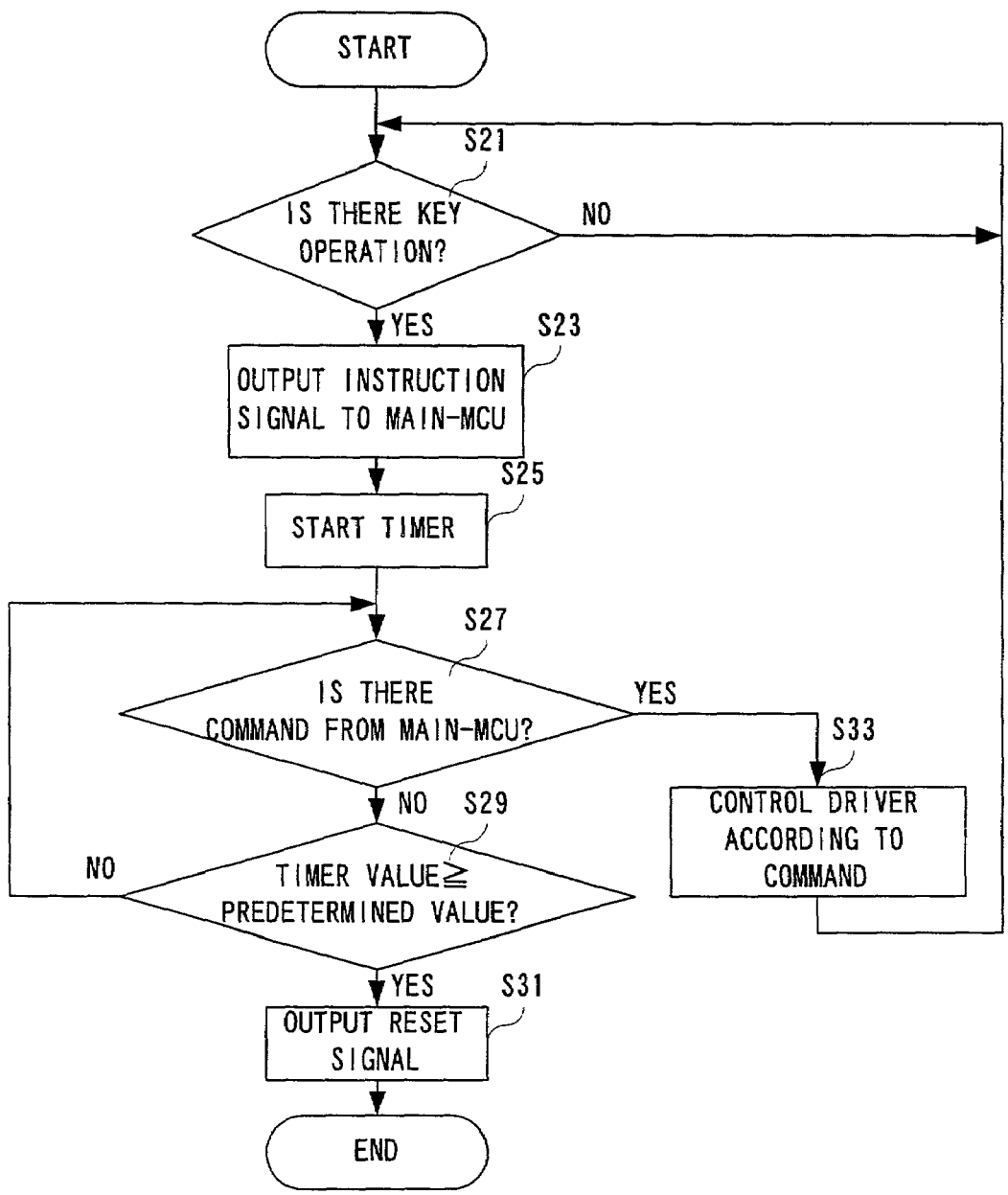
FIG. 4 is a flowchart showing a part of the processing of the sub-MCU shown in FIG. 3.

Specifically, the sub-MCU 14 executes the processing according to a flowchart shown in FIG. 4. Firstly, the sub-MCU 14 determines, in step S21, whether an instruction signal is inputted or not, i.e. the key operation is presented or not. If "NO" is determined in the step S 21, i.e. the key operation is not presented, the process returns to the same step S 21. On the other hand, if "YES" is determined in the step 21, i.e. an instruction signal is inputted, an instruction signal is applied to the main-MCU 12 in step 23, and a timer 14*a* starts to count in step S 25. In succeeding step S27, whether a specified command is applied from the main-MCU 12 or not is determined If "YES" is determined in the step S 27, i.e. a specified command is inputted, in step 33, the drivers 30–34 are controlled in accordance with the inputted command. On the other hand, if "NO" is determined in the step S 27, i.e. the specified command is not inputted, it is determined by the sub-MCU 34 whether a predetermined time period (for example, 20 seconds) is elapsed with reference to a timer value of the timer 14*a* or not is determined in step S 29. If "NO" is determined in the step S 29, i.e. twenty (20) seconds has not been elapsed, the process directly returns to the step S 27. On the other hand, if "YES" is determined in the step S 29, i.e. twenty (20) seconds has been elapsed, it is determined by the sub-MCU 34 the main-MCU 12 is being in a hang-up state, and a reset signal is outputted during a predetermined period (for example, 5 seconds), then, ending the process.

According to above-described further embodiment, a hang-up is determined depending on whether a specified command is applied or not within a predetermine time period from the time that an instruction signal is inputted to the sub-MCU 14, and an instruction signal is applied to the main-MCU 12, thus, making it possible to detect a hang-up.

Meanwhile, like FIG. 1 embodiment, it is easy to return from a hang-up.

Furthermore, in further embodiment, since an instruction signal from the remocon transmitter 26 is also applied to the sub-MCU 14, the hang-up of the main-MCU 12 can be detected by the key operation of the remocon transmitter 26.

It is noted that the description was made on the case that the system 10 is applied to the DVD reproducing apparatus in these embodiments, it is needless to say that the present invention can be applied to another apparatus such as a VTR.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. In a two-MCU system provided with a main-MCU which is power-on-reset and a sub-MCU which is reset by said main-MCU, said main-MCU applying a command to said sub-MCU according to an operation of an operating key, a method of detecting a hang-up of said main-MCU comprises the following steps of:
    (a) applying an operation signal from a specified operating key to said sub-MCU; and
    (b) detecting the hang-up of said main-MCU when no specified command is received within a predetermined time period from a time that said sub-MCU has received said operation signal.

2. A detecting method according to claim 1, wherein said step (b) includes a step of (b1) applying a reset signal to a reset circuit of said main-MCU when detecting the hang-up of said main MCU.

3. A detecting method according to claim 2, wherein said two-MCU system is provided with a remocon reception circuit, and said operating key is a key provided on a main body.

4. A detecting method according to claim 1, wherein said main-MCU governs control of an overall system, and said sub-MCU governs control of a mechanism.

5. In a two-MCU system provided with a main-MCU which is power-on-reset and a sub-MCU which is reset by said main-MCU, said sub-MCU applying an instruction signal to said main-MCU according to a reception of an operation signal from an operating key, and said main-MCU applying a command to said sub-MCU according to said instruction signal, a method of detecting a hang-up of said main-MCU comprises the following steps of:
    detecting the hang-up of said main-MCU when no specified command is received within a predetermined time period from a time that said sub-MCU has applied said instruction signal.

6. A two-MCU system, comprising:
    a main-MCU which is power-on-reset;
    a sub-MCU which is reset by said main-MCU, said main-MCU applying a command to said sub-MCU according to an operation of an operating key;
    a reset circuit which resets said main-MCU; and
    a timer which starts counting a time period when said sub-MCU receives an operation signal from an specified operating key, wherein
    said sub-MCU applies a reset signal to said reset-circuit when no specified command is received within a predetermine time period from a time that said operation signal has been received.

7. A two-MCU system according to claim 6, further comprising a reception circuit for receiving a remocon signal, wherein said operating key is provided on a system main body.

8. A two-MCU system according to claim 7, wherein said main-MCU governs control of an overall system, and said sub-MCU governs control of a mechanism.

9. A two-MCU system, comprising:
    a main-MCU which is power-on-reset;
    a sub-MCU which is reset by said main-MCU, said sub-MCU applying an instruction signal to said main-MCU in response to a reception of an instruction signal from an operating key, and said main-MCU applying a command to said sub-MCU according to said instruction signal;
    a reset circuit which resets said main-MCU; and
    a timer which starts counting a time period when said sub-MCU applies said instruction signal, said sub-MCU applying a reset signal to said reset circuit when no specified command is received within a predetermined time period from a time that said instruction signal has been applied.

10. In a two-MCU system provided with a main-MCU which is power-on-reset and a sub-MCU which is reset by said main-MCU, said main-MCU applying a command to said sub-MCU according to an operation of an operating key, a method of detecting hang-up of said main-MCU comprises the following steps of:
    (a) simulating use or operation of said main-MCU by sending an operation signal from a specified operating key to said sub-MCU;

(b) starting a timer when said sub-MCU receives said operation signal from specified operating key;
(c) detecting the hang-up of said main-MCU when no additional said operation signal from the main MCU is received by said sub-MCU within a predetermined time period; and
(d) applying a reset signal to reset the main-MCU.

11. A two-MCU system comprising:

a sub-MCU;

a timer;

a main-MCU for controlling the system, which can be reset by a separate circuit, and can send an operation signal to said sub-MCU, thereby indicating use, or simulated use, of a specified operating key by the main-MCU;

a reset circuit capable of receiving signals from said timer, whereby said timer is capable of starting a counter when said sub-MCU receives said operation signal from said specified operating key, and whereby said timer is capable of restarting said counter upon receipt of each additional said operation signal from said specified operating key;

said reset circuit capable of determining when said counter exceeds a predetermined value, thereby indicating hang-up of said main-MCU; and said reset circuit capable of sending a reset signal to said main-MCU, thereby resetting said main-MCU.

* * * * *